(12) United States Patent
Cutting et al.

(10) Patent No.: US 11,068,659 B2
(45) Date of Patent: Jul. 20, 2021

(54) SYSTEM, METHOD AND COMPUTER PROGRAM PRODUCT FOR DETERMINING A DECODABILITY INDEX FOR ONE OR MORE WORDS

(71) Applicant: Vanderbilt University, Nashville, TN (US)

(72) Inventors: Laura Elizabeth Cutting, Nashville, TN (US); Neena Marie Saha, Nashville, TN (US); Ted Stephen Hasselbring, Nashville, TN (US)

(73) Assignee: Vanderbilt University, Nashville, TN (US)

( * ) Notice: Subject to any disclaimer, the term of this patent is extended or adjusted under 35 U.S.C. 154(b) by 157 days.

(21) Appl. No.: 15/987,392

(22) Filed: May 23, 2018

(65) Prior Publication Data

US 2018/0341641 A1 Nov. 29, 2018

Related U.S. Application Data

(60) Provisional application No. 62/509,856, filed on May 23, 2017.

(51) Int. Cl.
*G06F 40/20* (2020.01)
*G06F 40/30* (2020.01)
(Continued)

(52) U.S. Cl.
CPC .............. *G06F 40/30* (2020.01); *G06F 40/20* (2020.01); *G06F 40/232* (2020.01); *G09B 17/00* (2013.01); *G09B 17/04* (2013.01); *G10L 13/08* (2013.01); *G10L 15/187* (2013.01); *G10L 2015/025* (2013.01)

(58) Field of Classification Search
None
See application file for complete search history.

(56) References Cited

U.S. PATENT DOCUMENTS 7,219,059 B2 * 5/2007 Gupta ..................... G10L 15/10
704/238
8,271,281 B2 * 9/2012 Jayadeva ................ G10L 15/26
434/185

(Continued)

OTHER PUBLICATIONS

Breland, "Word frequency and word difficulty a comparison of counts in four corpora", Psychological Science vol. 7, No. 2, pp. 96-99 (Mar. 1996).*

(Continued)

*Primary Examiner* — Richard Z Zhu
(74) *Attorney, Agent, or Firm* — Meunier Carlin & Curfman LLC

(57) ABSTRACT

Described herein are methods, systems and computer program products for determining a decodability index for one or more words. One of the methods of determining a decodability index for one or more words comprises receiving one or more words for analysis; analyzing the received one or more words using a plurality of effects; and assigning a decodability index to the received one or more words based on the analysis of the received one or more words using the plurality of effects, wherein the assigned decodability index indicates an ability of a person to pronounce or sound out the one or more words.

17 Claims, 3 Drawing Sheets

(51) Int. Cl.
  *G06F 40/232*  (2020.01)
  *G09B 17/04*   (2006.01)
  *G10L 13/08*   (2013.01)
  *G10L 15/02*   (2006.01)
  *G09B 17/00*   (2006.01)
  *G10L 15/187*  (2013.01)

(56) References Cited

U.S. PATENT DOCUMENTS

| | | | | |
|---|---|---|---|---|
| 9,031,836 | B2* | 5/2015 | Michaelis | G10L 21/02 |
| | | | | 381/58 |
| 9,043,199 | B1* | 5/2015 | Hayes | G10L 15/26 |
| | | | | 704/9 |
| 10,134,297 | B2* | 11/2018 | Beigman Klebanov | |
| | | | | G09B 7/02 |
| 2005/0042583 | A1* | 2/2005 | Barker | B42D 1/001 |
| | | | | 434/159 |
| 2007/0112569 | A1* | 5/2007 | Wang | G10L 13/08 |
| | | | | 704/260 |
| 2008/0140413 | A1* | 6/2008 | Millman | G09B 7/02 |
| | | | | 704/270 |
| 2009/0138270 | A1* | 5/2009 | Fletcher | G09B 19/04 |
| | | | | 704/271 |
| 2009/0305203 | A1* | 12/2009 | Okumura | G09B 5/06 |
| | | | | 434/185 |
| 2010/0211376 | A1* | 8/2010 | Chen | G10L 15/187 |
| | | | | 704/2 |
| 2011/0111377 | A1* | 5/2011 | Dekkers | G09B 17/006 |
| | | | | 434/156 |
| 2013/0138665 | A1* | 5/2013 | Hu | G06F 16/36 |
| | | | | 707/749 |
| 2013/0179170 | A1* | 7/2013 | Cath | G10L 13/08 |
| | | | | 704/260 |
| 2014/0295384 | A1* | 10/2014 | Nielson | G09B 5/00 |
| | | | | 434/157 |
| 2015/0095031 | A1* | 4/2015 | Conkie | G10L 15/187 |
| | | | | 704/254 |
| 2017/0308654 | A1* | 10/2017 | Luz Rello-Sanchez | |
| | | | | G06N 5/04 |
| 2018/0271427 | A1* | 9/2018 | Gabel | G09B 5/08 |

OTHER PUBLICATIONS

Petersen, et al., "Predicting Reading Difficulty in First Grade Using Dynamic Assessment of Decoding in Early Kindergarten: A Large-Scale Longitudinal Study", Journal of Learning Disabilities 2016, vol. 49(2) 200-215.

Berndt, R. S., Reggia, J. A., & Mitchum, C. C. (1987). Empirically derived probabilities for grapheme-to-phoneme correspondences in English. Behavior Research Method, Instruments, & Computers, 19, 1-9.

Marian, V., Bartolotti, J., Chabal, S., & Shook, A. (2012). CLEARPOND: Cross-linguistic easy-access resource for phonological and orthographic neighborhood densities. PloS one, 7(8), e43230.

Kuperman, V., Stadthagen-Gonzalez, H., & Brysbaert, M. (2012). Age-of-acquisition ratings for 30,000 English words. Behavior Research Methods, 44(4), 978-990.

Cortese, M. J., & Fugett, A. (2004). Imageability ratings for 3,000 monosyllabic words. Behavior Research Methods, 36(3), 384-387.

Brysbaert, M., Warriner, A. B., & Kuperman, V. (2014). Concreteness ratings for 40 thousand generally known English word lemmas. Behavior research methods, 46(3), 904-911.

Ziegler, J. C., & Goswami, U. (2005). Reading acquisition, developmental dyslexia, and skilled reading across languages: a psycholinguistic grain size theory. Psychological bulletin, 131(1), 3-29.

Goswami, U., & Mead, F. (1992). Onset and rime awareness and analogies in reading. Reading Research Quarterly, 153-162.

Storkel, et al., An online calculator to compute phonotactic probability and neighborhood density on the basis of child corpora of spoken American English, Behavior Research Methods 2010, 42 (2), 497-506. doi:10.3758/BRM.42.2.497.

Vitevitch, M.S., A Web-based interface to calculate phonotactic probability for words and nonwords in English, Behavior Research Methods, Instruments, & Computers, 2004, 36 (3), 481-487.

Balota, David A., et al. "The English lexicon project" Behavior research methods 39.3 (2007): 445-459.

Michael Vitevitch, Phonotactic Probability, 2 pages. Available online: http://phonotactic.dept.ku.edu/.

Moats, L. "Still wanted: Teachers with knowledge of language". Journal of Learning Disabilities, (2009) 42(5), 387-391.

Radeau, Monique, and Jose Morais. "The uniqueness point effect in the shadowing of spoken words." Speech Communication 9.2 (1990): 155-164.

Schreuder, Robert, and R. Harald Baayen. "How complex simplex words can be." Journal of memory and language 37.1 (1997): 118-139.

Storkel, Holly L. "A corpus of consonant—vowel—consonant real words and nonwords: Comparison of phonotactic probability, neighborhood density, and consonant age of acquisition." Behavior Research Methods 45.4 (2013): 1159-1167.

\* cited by examiner

SYSTEM, METHOD AND COMPUTER PROGRAM PRODUCT FOR DETERMINING A DECODABILITY INDEX FOR ONE OR MORE WORDS

CROSS REFERENCE TO RELATED APPLICATION

This application claims priority to and benefit of U.S. provisional patent application No. 62/509,856 filed May 23, 2017, which is fully incorporated by reference and made a part hereof.

BACKGROUND

Currently, there are many of measures of text complexity, but none of the present measure decodability, or how difficult it is for a person to "sound out" or pronounce a word. Currently, reading levels are established by formulas such as those created by Lexile™ (MetaMetrics. Durham, N.C.), Developmental Reading Assessment (DRA)™ or Fountas and Pinnell Literacy™ (Heinemann Publishing, Portsmouth, N.H.). These ways of determining a person's (e.g., child's) reading ability are largely based on three things: (1) frequency of the word (i.e., how often a certain word, such as "the" appears in the English written language) (2) semantic relationships between words and (3) how long the sentences are. Some formulas additionally consider whether pictures are included in text and how often words are repeated. None of these formulas, however, consider how hard it might be for the person to decode, or sound out, a word (the way of teaching children this skill is commonly referred to as phonics). For example, "bat" is an easy word to sound out because it has one sound per one letter, whereas "bait" has a long "a" sound represented by "ai". More complex words such as "though" have two sounds but many more letters than that to represent the sounds ("th" is one sound, and "ough" represents the long o sound). Where the issue of decodability is most prominent is in the Kindergarten through 3rd grades, when children are learning to sound out words and how sounds map onto different complex patterns of English. For example, one can find books labeled according to DRA levels as 1st grade, but have wildly different decoding demands.

Therefore, what are needed are systems, methods and computer program products that overcome challenges in the art, some of which are described above.

SUMMARY

Described and disclosed herein are embodiments of systems, methods and computer program products for determining a decodability index for one or more words. As disclosed and described herein, reading research from a range of disciplines has been synthesized to create a measure of decodability. Embodiments disclosed herein provide a decodability score for individual words and longer text, such as books. Potential applications include: (1) scoring existing text to match the individual instructional level for emerging/struggling/second language readers; (2) leveling new text to match the individual instructional level for emerging/struggling/second language readers; (3) assessing an individual's instructional level for decoding; and (4) using the tool to develop new reading programs.

In one aspect, methods of determining a decodability index for one or more words are disclosed. One of the methods comprises receiving one or more words for analysis; analyzing the received one or more words using a plurality of effects; and assigning a decodability index to the received one or more words based on the analysis of the received one or more words using the plurality of effects, wherein the assigned decodability index indicates an ability of a person to pronounce or sound out the one or more words.

The one or more words may be received in various ways. For instance, receiving the one or more words may comprise receiving, by a computing system, the one or more words as an electronic file. The electronic file may be created in any way known in the art including by a word processing program, by a scanning device that scans a hard-copy document and creates the electronic file, by a voice recognition program that converts spoken words into the electronic file, and the like.

In one embodiment of the method, analyzing the received one or more words using the plurality of effects comprises analyzing the received one or more words using a word frequency effect, a discrepancy effect, a conditional vowels effect and a consonant blends effect. Assigning the decodability index to the received one or more words based on the analysis of the received one or more words comprises a quantification of results from the analysis of the one or more words using the word frequency effect, the discrepancy effect, the conditional vowels effect and the consonant blends effect. In some instances, the quantification of results comprises adding together each of the results from the analysis of the one or more words using the word frequency effect, the discrepancy effect, the conditional vowels effect and the consonant blends effect. In other instances, other quantification techniques are used including taking an average of each of the results from the analysis of the one or more words using the word frequency effect, the discrepancy effect, the conditional vowels effect and the consonant blends effect, and the like. In some instances, the average can be a weighted average.

In other embodiments of the method, analyzing the received one or more words using the plurality of effects comprises analyzing the received one or more words using the word frequency effect, the discrepancy effect, the conditional vowels effect and the consonant blends effect plus one or more additional effects. In these instances, assigning the decodability index to the received one or more words based on the analysis of the received one or more words comprises a quantification of results from the analysis of the one or more words using the word frequency effect, the discrepancy effect, the conditional vowels effect, the consonant blends effect, and the one or more additional effects. As with above, quantification can include summation of each effect, taking an average of the values of the effects (including a weighted average), and other quantification techniques. The one or more additional effects include one or more of a phonotactic probability effect, an orthographic similarity effect, a neighborhood effect, an age of acquisition effect, an imageability effect, a concreteness effect, a voice-key bias effect, a uniqueness point effect, an onset/rime effect, a linguistic effect, and a Zipf's law effect.

In some instances, the one or more words comprise all or a portion of a piece of written literature such as an article, a magazine or a book, and the decodability index is assigned to the entire article, magazine or book. In such instances, the decodability index may be assigned to the entire article, magazine or book by adding together the decodability index for each word of the article, magazine or book. The decodability index can be assigned to the entire article, magazine or book by taking an average of the decodability index for each word of the article, magazine or book. In other instances, the decodability index can be assigned to the entire article, magazine or book by taking a sample of words that comprise the article, magazine or book and adding together or taking an average of the decodability index for each of the sample of words, wherein the sample of words is less than all of the one or more words that comprise the article, magazine or book. The size of the sample of words can be determined using statistical analysis.

Alternatively or optionally, the article, magazine or book can be recommended to a reader based on the decodability index assigned to the entire article, magazine or book. Generally, such a recommendation considers an assessment of the reader's ability to pronounce or sound out words.

In some instances, one or more of the steps of the methods can be performed by a processor executing computer-executable instructions.

Also disclosed and described herein are systems for determining a decodability index for one or more words. One of the systems comprises a processor; an interface communicatively coupled with the processor; and a memory communicatively coupled with the processor, wherein the memory contains computer-executable instructions that when executed by the processor cause the processor to: receive, using the interface, one or more words for analysis; analyze the received one or more words using a plurality of effects; and assign a decodability index to the received one or more words based on the analysis of the received one or more words using the plurality of effects, wherein the assigned decodability index indicates an ability of a person to pronounce or sound out the one or more words.

Further disclosed and described herein are methods of performing an assessment. One such method comprises a) assigning a decodability index to a plurality of words and/or word segments; b) audibly presenting one of the plurality of words and/or word segments to a person being assessed; c) visually presenting a plurality of word or word segment choices to the person being assessed, wherein only one of the presented word or word segment choices correctly corresponds to the audibly presented word or word segment; d) receiving a selection input from the person being assessed, wherein the selection input identifies one of the plurality of word or word segment choices; e) determining whether the received selection input is the presented word or word segment choice that correctly corresponds to the audibly presented word or word segment; f) repeating steps b)-e) a plurality of times, wherein a different word and/or word segment is presented to the person being assessed each time the steps are repeated; and, g) assessing the person based on the decodability index assigned to each of the words and/or word segments audibly presented to the person and a count of the received selection inputs that correctly corresponds to the audibly presented words or word segments.

In some embodiments, assigning the decodability index to the plurality of word and/or word segments comprises analyzing the plurality of words and/or word segments using a word frequency effect, a discrepancy effect, a conditional vowels effect and a consonant blends effect. Alternatively or optionally, assigning the decodability index to the plurality of word and/or word segments comprises a quantification of results from the analysis of the plurality of word and/or word segments using the word frequency effect, the discrepancy effect, the conditional vowels effect and the consonant blends effect.

In some instances, audibly presenting one of the plurality of words and/or word segments to a person being assessed comprises a processor executing software to audibly present one of the plurality of words and/or word segments to a person being assessed using an audio output device. For example, the audio output device may comprise a speaker. The processor may be a part of a smart device such as a computer, smart phone, and the like. In some instances, the plurality of word or word segment choices are visually presented to the person being assessed on a display of the smart device and the selection input from the person being assessed is received from an input mechanism associated with the smart device. In various aspects, the input mechanism may comprise a keyboard or keypad, a touch screen display, and the like.

In some instances, the method of performing the assessment may further include providing recommendations for instruction, intervention, texts for the person based on the assessment of the person.

It should be understood that the above-described subject matter may also be implemented as a computer-controlled apparatus, a computing system, or an article of manufacture, such as a computer program product stored on a computer-readable storage medium.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Furthermore, as used herein, the terms "word" or "words" includes a complete word, only a portion of a word, or a word segment.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

Figure 1:
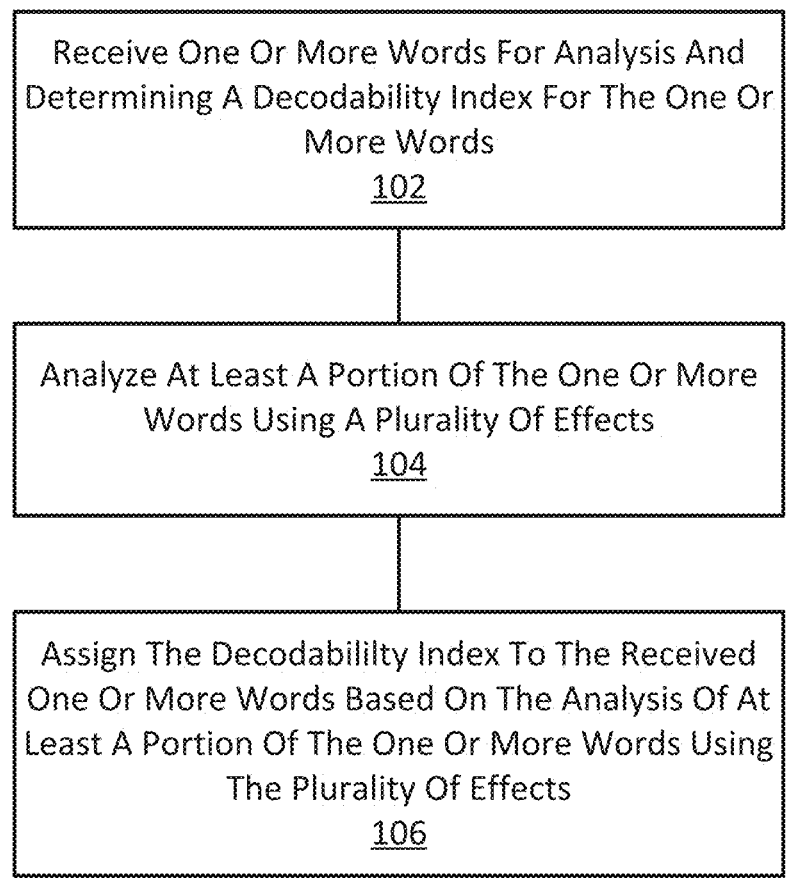
FIG. 1 illustrates a flowchart for an exemplary method of determining a decodability index for one or more words.

Referring now to FIG. 1, a flowchart is provided for an exemplary method of determining a decodability index for the one or more words. At step 102, one or more words are received for analysis and determining the decodability index for the one or more word. For example, receiving the one or more words may comprise receiving, by a computing system (as described below), the one or more words as an electronic file. The electronic file may be created in various ways. For example, the electronic file may be created by a word processing program. In another aspect, the electronic file may be created by a scanning device (e.g. a scanner) that scans a hard-copy document and creates the electronic file. In yet another aspect, the electronic file may be created by a voice recognition program that converts spoken words into the electronic file.

Returning to FIG. 1, at 104, at least a portion of the received one or more words are analyzed using a plurality of effects. In one aspect, analyzing the received one or more words using the plurality of effects may comprise analyzing all or a portion of the received one or more words using a word frequency effect, a discrepancy effect, and a conditional score such as a conditional vowels effect. In yet another aspect, analyzing the received one or more words using the plurality of effects may comprise analyzing all or a portion of the received one or more words using a word frequency effect, a discrepancy effect, a conditional vowels effect and a consonant blends effect. In addition, analyzing the received one or more words using the plurality of effects may comprise analyzing all or a portion of the received one or more words using one or more of a phonotactic probability effect, an orthographic similarity effect, a neighborhood effect, an age of acquisition effect, an imageability effect, a concreteness effect, a uniqueness point effect, and an onset/rime effect.

When using a word frequency effect to analyze all or a portion of the received one or more words, a SFI (standard frequency index) is determined for each word in a group of words. In one example, every word of a language has an assigned SFI index. For example, SFI indexes for English words can be found at Zeno, S. (1995). The educator's word frequency guide. Brewster, N J: Touchstone Applied Science Associates, which is incorporated by reference. SFI values are provided in a percent value. In one exemplary embodiment, the percent value is converted to a decimal value and subtracted from 1. For example, in one group of words under analysis the SFI returned for the word, "a" is 83.8 (a percent value). The percent value is multiplied by 0.01 (1/100) to convert to a decimal value and get 0.838. The decimal value 0.838 is subtracted from 1 and to obtain 0.162. This is the value for frequency part of the exemplary decoding measure. In one aspect, words with an SFI score of 80 (percent) and greater receive 0 points toward the total since they are so common. This is only one example of determining a word frequency; it is to be appreciated that this disclosure contemplates any other method of calculating a word frequency index within its scope.

When using the discrepancy effect to analyze all or a portion of the received one or more words, the number of phonemes in each word is subtracted from the number of letters in each word. In some instances, if the value after the number of phonemes in a word is subtracted from the number of letters is negative (less than zero), an absolute value is taken such that the value is positive. A computing device can be used to count the number of letters in a word and/or count the number of phonemes. In some instances, the number of phonemes may be found in a look-up table. In some instances, a word may have more than one number of phonemes because of alternative pronunciations. In those instances, rules can be implemented when the computing device is determining the number of phonemes such that the largest number of phonemes is used, the smallest number of phonemes is used, or an average number of phonemes for the word is used.

When using the conditional vowels effect to analyze all or a portion of the received one or more words, the formula uses the Berndt et al. (1987) conditional probability (Berndt, R. S., Reggia, J. A., & Mitchum, C. C. (1987). Empirically derived probabilities for grapheme-to-phoneme correspondences in English. *Behavior Research Method, Instruments, & Computers*, 19, 1-9, incorporated by reference) to get a percentage. 1 minus the percentage is how many points is calculated per vowel/vowel team. For example, a word has an "A" which is used as a short a sound /a/ has one vowel. The conditional probability of the letter A making the short sound /a/ is 0.54 in Berndt et al. (1987). So, 1−0.54=0.46. 0.46 is then added to the other two parts above.

When using the consonant blends effect to analyze all or a portion of the received one or more words, each word receives 1 point for each consonant blend it contains. Double letters (for example, 'll') are not considered blends, and digraphs (two or more consonant that make one sound such as "ch") are not included here as they are already accounted for in the discrepancy part of the decoding measure.

Figure 2:
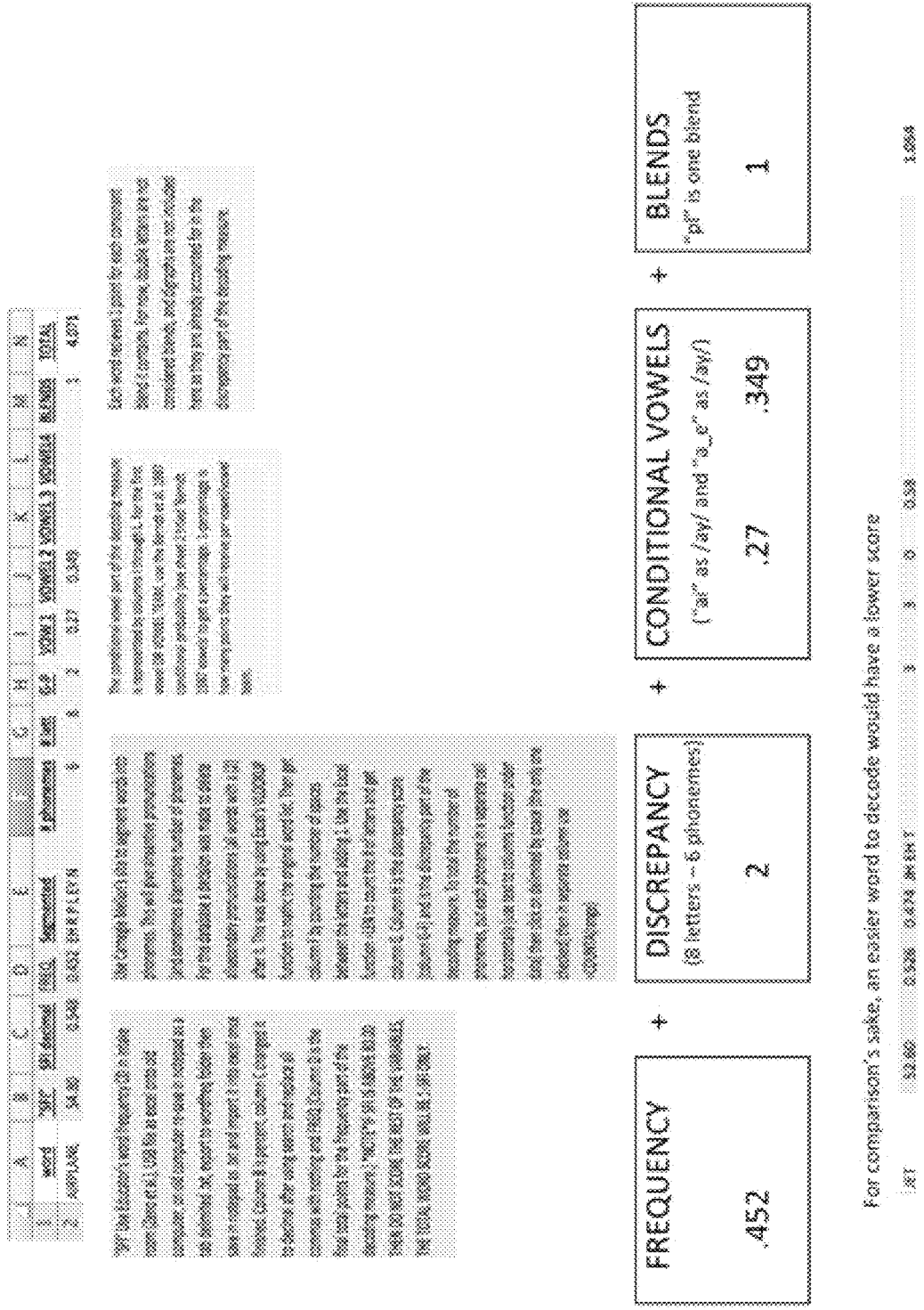
FIG. 2 is an example illustration of determining the decodability index for two separate words, "airplane" and "jet"

Returning to FIG. 1, at 106 a decodability index is assigned to the received one or more words based on the analysis of the received one or more words using the plurality of effects, wherein the assigned decodability index indicates an ability of a person to pronounce or sound out the one or more words. For example, as shown in FIG. 2, the word "airplane" has a decodability index of 4.071, while the more simple word "jet" has a decodability index of 1.055. Looking at the components that result in the 4.071 decodability index of "airplane," the word has a word frequency effect of 0.452, a discrepancy effect of 2, a conditional vowels effect of 0.27 and 0.349, and a consonant blends effect of 1. "Jet," on the other hand, has only two components, a word frequency effect of 0.474 and a conditional vowels effect of 0.58, resulting in a decodability index of 1.054. Therefore, the decodability index indicates that "jet" is easier to pronounce or to sound out than "airplane."

In the above examples, the plurality of effects used to determine the decodability index were added together to arrive at the decodability index. However, it is to be appreciated that other mathematical functions may be performed on the plurality of effects for quantification to arrive at value that reflects. For example, in some instances the values for each of the plurality of effects can be averaged, including taking a weighted average where the value of some of the plurality of effects is weighted more heavily when determining the decodability index than the value of other effects. Other non-limiting examples of quantification of the plurality of effects that comprise the decodability index include standard deviation, mean, median, mode, using ranges (where some values are not considered if they are within a certain range or out of a certain range), absolute values, tallying frequencies of words with certain scores (for example, you would not want a children's book for a beginning reader to have more than 50% of its words with a score of 5 or higher) and representing this as a ratio, discounting the total word score for each repeated word ("bread" gets 5 points the first time, 4 the second time it appears, etc.) and then averaging the words or summing the effects, and the like.

In some instances, the decodability index is determined using one or more additional effects. Below, in Table 1, are non-limiting, non-exhaustive examples of additional effects that may be considered when arriving at a decodability index for one or more words:

TABLE I

Examples of Additional Effects

| Effect | Measurement/Database Source |
|---|---|
| Phonotactic probability | http://phonotactic.dept.ku.edu/ (Michael Vitevitch) https://kuscholarworks.ku.edu/handle/1808/19929 (Holly Storkel) |
| Orthographic similarity | http://talyarkoni.org/resources - or - Marian, V., Bartolotti, J., Chabal, S., & Shook, A. (2012). CLEARPOND: Cross-linguistic easy-access resource for phonological and orthographic neighborhood densities. *PloS one*, 7(8), e43230. |
| Neighborhood effects | Marian, V., Bartolotti, J., Chabal, S., & Shook, A. (2012). CLEARPOND: Cross-linguistic easy-access resource for phonological and orthographic neighborhood densities. *PloS one*, 7(8), e43230. |
| Age of Acquisition | Kuperman, V., Stadthagen-Gonzalez, H., & Brysbaert, M. (2012). Age-of-acquisition ratings for 30,000 English words. *Behavior Research Methods*, 44(4), 978-990. |
| Imageability | Cortese, M. J., & Fugett, A. (2004). Imageability ratings for 3,000 monosyllabic words. *Behavior Research Methods*, 36(3), 384-387. |
| Concreteness | Brysbaert, M., Warriner, A. B., & Kuperman, V. (2014). Concreteness ratings for 40 thousand generally known English word lemmas. *Behavior research methods*, 46(3), 904-911. |
| Voice-key bias (initial phoneme effect) | The largest proportion of unique variance was attributable to initial phoneme: voiced initial phonemes triggered the voice key faster than unvoiced; fricatives activated the voice key later than other phonemes; and bilabials, labiodentals, and velars gave rise to faster voice-key responses than did phonemes with alternative places of articulation. |
| Uniqueness point | Radeau, M., & Morals, J. (1990). The uniqueness point effect in the shadowing of spoken words. *Speech Communication*, 9(2), 155-164. |
| Morphology (ratio of noun/verb) | Schreuder, R., & Baayen, R. H. (1997). How complex simplex words can be. *Journal of memory and language*, 37(1), 118-139. |
| Onset/rime effect | Ziegler, J. C., & Goswami, U. (2005). Reading acquisition, developmental dyslexia, and skilled reading across languages: a psycholinguistic grain size theory. *Psychological bulletin*, 131(1), 3. Goswami, U., & Mead, F. (1992). Onset and rime awareness and analogies in reading. *Reading Research Quarterly*, 153-162. |
| Linguistic effects | Perhaps certain linguistic segments (larger than phonemes, smaller than words) of letters have more predictability (are more stable). |
| Zipf's law | Zipf's law states that given some corpus of natural language utterances, the frequency of any word is inversely proportional to its rank in the frequency table. Thus, the most frequent word will occur approximately twice as often as the second most frequent word, three times as often as the third most frequent word, etc.: the rank-frequency distribution is an inverse relation. |

For example, analyzing the received one or more words using the plurality of effects may comprise analyzing all or a portion of the received one or more words using a word frequency effect, a discrepancy effect, and a conditional score such as a conditional vowels effect and one or more additional effects; or analyzing the received one or more words using the plurality of effects may comprise analyzing all or a portion of the received one or more words using a word frequency effect, a discrepancy effect, a conditional vowels effect, a consonant blends effect and one or more additional effects. The additional effects may comprise one or more of a phonotactic probability effect, an orthographic similarity effect, a neighborhood effect, an age of acquisition effect, an imageability effect, a concreteness effect, a uniqueness point effect, and an onset/rime effect.

In some instances, the one or more words used to determine a decodability index comprise an article, a magazine, a book, etc., and the decodability index is assigned to the entire article, magazine or book. For example, the decodability index can be assigned to the entire article, magazine or book by adding together the decodability index for each word of the article, magazine or book, by taking an average of the decodability index for each word of the article, magazine or book, or by any other means of quantifying the difficulty of pronouncing the words that comprise the article, magazine, book, etc. In some instances, the decodability index can be assigned to the entire article, magazine or book by taking a sample of words that comprise the article, magazine or book and adding together the decodability index for each of the sample of words, wherein the sample of words is less than all of the one or more words that comprise the article, magazine or book. In other instances, the decodability index can be assigned to the entire article, magazine or book by taking a sample of words that comprise the article, magazine or book and taking an average of the decodability index for each of the sample of words, wherein the sample of words is less than all of the one or more words that comprise the article, magazine or book. The size of the sample can be determined using statistical analysis so that a confidence for the assigned decodability index can be provided.

An advantage of determining the decodability index for the article, magazine, book, etc. is the ability to assign a written piece of literature (e.g., article, magazine, book, etc.) to a reader based on the decodability index that has been assigned to the entire article, magazine or book. For example, a person's ability to pronounce or sound out words can be assessed and that assessment can be used to recommend literature having a certain decodability index or range of decodability indexes. In some instances, the reader's ability to pronounce or sound out words can be performed using, for example, voice recognition software.

In some instances, the assessment of a person's ability to pronounce or sound out words is performed using one or more known assessment techniques. For example, a person (e.g., child) obtains an assessment using an existing measure of decoding (e.g., a subtest from the Woodcock Johnson Psychoeducational Battery-IV called Word Attack). The information from this assessment is used to select an appropriate text (e.g., article, magazine, book, etc.) that has the appropriate decodability index assigned to it for this child. In other instances, the decodability index can be used to assess the person's (e.g., child's) ability to pronounce or sound out words. For example, the child can be administered one or more words and monitored to determine the child's ability to pronounce or sound out these words. The decodability index can be assigned to the child based on their ability to pronounce or sound out one or more words that have an assigned decodability index. This information can be used to select an appropriate text that has the appropriate decodability level assigned to it (from the disclosed decodability index) for this child.

Consider the following non-limiting method for performing an assessment. The assessment comprises several items such as words or word segments that would each be 'tagged' (i.e., assess and assigned, as described herein) with a decodability index. A person (e.g., child) reads these pre-evaluated words or word segments out loud and their pronunciation of the word or word segments is recorded. The recorded pronunciation is then evaluated for errors. For example, the pronunciation can be recorded and analyzed using a processor programmed to compare the recorded pronunciation to the correct pronunciation of the word or word segments. Errors are identified based on this comparison and patterns of errors that can be associated with a specific decodability index for words or word segments can be identified and assessed. Recommendations for instruction, intervention, or texts can be provided based on the assessment. Alternatively, the pre-evaluated word or word segment can be electronically generated using a processor programmed to audibly output the word or word segment (using correct pronunciation). For example, a computer or a smart device such as a smart phone can be programmed to audibly emit the word or word segment. The subject (e.g., child) then picks which word (out of a plurality (e.g., four) of choices) that the person thinks sounds like that word. This can be done using a display of the computer or smart device. If the person has a pattern of errors that can be associated with a specific decodability index for words or word segments, this is assessed and recommendations for instruction, intervention, texts can be provided based on the assessment.

Also consider this more specific (yet also non-limiting) example of an assessment: (Step 1) A child hears an app executing on a smart device (e.g., smart phone) read the word 'hope' and the child is asked by the app to pick (using the display and input mechanisms (keyboard, touch screen, etc.) of the smart device) which of the following is the word s/he just heard: a) hope, b) hop c) hoop d) hopp. (Step 2) The child picks b) hop, which is incorrect, suggesting the child has a problem with the o_e pattern. (Step 3) The word "hope" has been assessed and assigned a decodability index and based on the assigned decodability index, the app executing on the smart device recognizes the word "hope" has a o_e→/O/ grapheme to phoneme correspondence and that the word "hope" has no blends (based on the decodability index). (Step 4) Based on statistical analysis of the words and word segments and the decodability index assigned to the words and word segments that are presented to the child, a processor associated with the smart device executes software to determine the child's pattern of errors after several words and/or word segments (each having an associated decodability index) are presented to the child and the child responds to the word/word segment s/he heard. (Step 5) A report is generated by the smart device that shows the child's weakest grapheme→phoneme matches, and which blends were hardest, etc. (Step 6) Because there are over 300 grapheme to phoneme matches, the report could suggest 'high-utility' correspondences to teach. Here, 'high-utility' refers to the correspondences that the child is very likely to encounter in text.

As noted herein, in some instances, it may be desired to obtain feedback from a reader to assess the reader's ability to read one or more words having a given decodability index. For example, a person or a class of people that have difficulty pronouncing certain phonemes may have a specific decodability index for one or more words (e.g., articles, magazines, books, etc.) that contain numerous instances of those certain phonemes. In other words, the decodability index for an article, magazine, book, etc. that contains numerous instances of those certain phonemes will indicate a higher level of difficulty for that person or class of persons than it would for the common masses. Though the example illustrates phonemes, this can apply to various effects that comprise the decodability index. In other words, the various effects that are combined to arrive at the decodability index may be weighted to reflect a reader's ability to pronounce or sound out certain words so that a reading program can be developed specifically for that person or class of persons. This can also be used in assisting a learning reader as a reading program can be tailored to that person or class of persons based upon that person's or the class's personalized decodability index. It is to be appreciated that the decodability index can be calculated for text in any language. It is not limited to English or any one language.

In addition to having the decoding measure interactively adapt to the learner's level (as in a computer program to teach reading), the decoding measure can also adapt based on a learner's native language. For example, if a student is a native Spanish speaker, and is now learning English, they will be unfamiliar with orthographic units such as final silent e in "hope", as there are very few if any final silent e's in Spanish. Therefore, this orthographic-phonemic mapping (final silent e) could be given a higher score in the conditional (currently 3rd effect) part of the decoding measure. In contrast, a native French speaker is familiar with the notion that the final e can be silent (because it is often silent in French), and therefore a word such as "hope" would not be as difficult to decode. The aforementioned example used a known letter that exists in all three languages ("e"), but it can also be applied to unknown phonemes/letters. For example, learning a completely new letter that is paired with a completely new sound might be even more difficult. Generally, this language adaptability occurs through weighting within the conditional part of the decodability index and not altering the frequency, discrepancy, or blends effects subtotals. However, in altering the subtotal of the conditional part, it would change the overall decoding measure score of words with silent e for that individual (or for all native Spanish-speaking individuals.) It is to be appreciated that the concept of a person who is native in one language and learning another language (e.g., English) as a second language is separate from the concept that the decodability index can be calculated for text in any languages (an emerging English reader learning English or a Spanish-speaking illiterate adult learning Spanish for the first time).

It is to be appreciated that the above described steps can be performed by computer-readable instructions executed by a processor. As used herein, a processor is a physical, tangible device used to execute computer-readable instructions. The steps performed by the processor include not only determining the decodability index for a word or group of words, but also for the assessment of a reader, providing a personalized decodability index for a person or class of persons, and for providing recommendations to a reader based upon assigned decodability indexes (personalized or otherwise).

Figure 3:
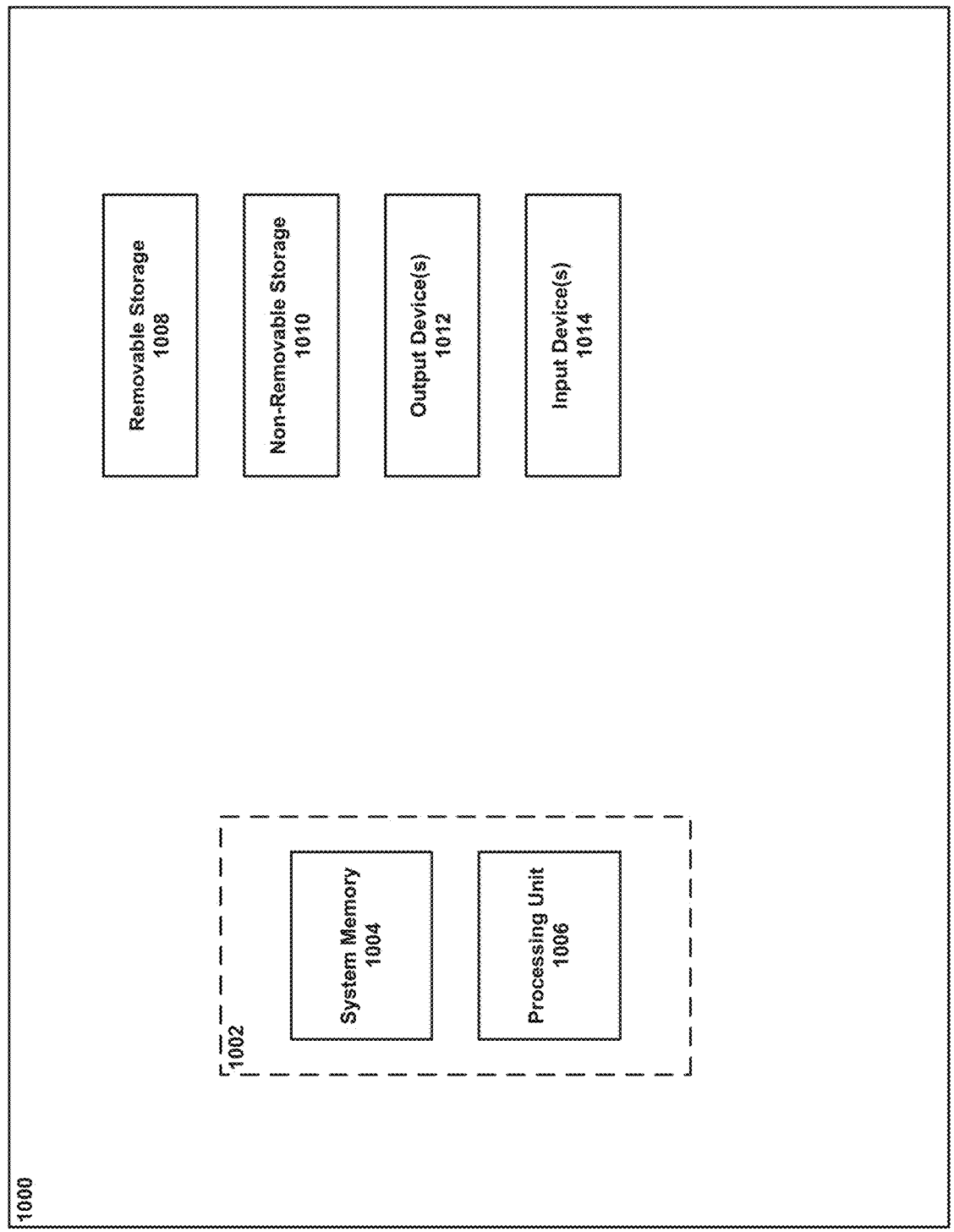
FIG. 3 is a block diagram of an example computing device upon which embodiments of the invention may be implemented.

When the logical operations described herein are implemented in software, the process may execute on any type of computing architecture or platform. For example, referring to FIG. 3, an example computing device upon which embodiments of the invention may be implemented is illustrated. In particular, at least one processing device described above may be a computing device, such as computing device 1000 shown in FIG. 3. For example, computing device 1000 may be a component of the cloud computing and storage system. Computing device 1000 may comprise all or a portion of server. The computing device 1000 may include a bus or other communication mechanism for communicating information among various components of the computing device 1000. In its most basic configuration, computing device 1000 typically includes at least one processing unit 1006 and system memory 1004. Depending on the exact configuration and type of computing device, system memory 1004 may be volatile (such as random access memory (RAM)), non-volatile (such as read-only memory (ROM), flash memory, etc.), or some combination of the two. This most basic configuration is illustrated in FIG. 3 by dashed line 1002. The processing unit 1006 may be a standard programmable processor that performs arithmetic and logic operations necessary for operation of the computing device 1000.

Computing device 1000 may have additional features/functionality. For example, computing device 1000 may include additional storage such as removable storage 1008 and non-removable storage 1010 including, but not limited to, magnetic or optical disks or tapes. Computing device 1000 may also contain network connection(s) 1016 that allow the device to communicate with other devices. Computing device 1000 may also have input device(s) 1014 such as a keyboard, mouse, touch screen, scanner, etc. Output device(s) 1012 such as a display, speakers, printer, etc. may also be included. The additional devices may be connected to the bus in order to facilitate communication of data among the components of the computing device 1000. All these devices are well known in the art and need not be discussed at length here. Though not shown in FIG. 3, in some instances computing device 1000 includes an interface. The interface may include one or more components configured to transmit and receive data via a communication network, such as the Internet, Ethernet, a local area network, a wide-area network, a workstation peer-to-peer network, a direct link network, a wireless network, or any other suitable communication platform. For example, interface may include one or more modulators, demodulators, multiplexers, demultiplexers, network communication devices, wireless devices, antennas, modems, and any other type of device configured to enable data communication via a communication network. Interface may also allow the computing device to connect with and communicate with an input or an output peripheral device such as a scanner, printer, and the like.

The processing unit 1006 may be configured to execute program code encoded in tangible, computer-readable media. Computer-readable media refers to any media that is capable of providing data that causes the computing device 1000 (i.e., a machine) to operate in a particular fashion. Various computer-readable media may be utilized to provide instructions to the processing unit 1006 for execution. Common forms of computer-readable media include, for example, magnetic media, optical media, physical media, memory chips or cartridges, a carrier wave, or any other medium from which a computer can read. Example computer-readable media may include, but is not limited to, volatile media, non-volatile media and transmission media. Volatile and non-volatile media may be implemented in any method or technology for storage of information such as computer readable instructions, data structures, program modules or other data and common forms are discussed in detail below. Transmission media may include coaxial cables, copper wires and/or fiber optic cables, as well as acoustic or light waves, such as those generated during radio-wave and infra-red data communication. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit 1006 may execute program code stored in the system memory 1004. For example, the bus may carry data to the system memory 1004, from which the processing unit 1006 receives and executes instructions. The data received by the system memory 1004 may optionally be stored on the removable storage 1008 or the non-removable storage 1010 before or after execution by the processing unit 1006.

Computing device 1000 typically includes a variety of computer-readable media. Computer-readable media can be any available media that can be accessed by device 1000 and includes both volatile and non-volatile media, removable and non-removable media. Computer storage media include volatile and non-volatile, and removable and non-removable media implemented in any method or technology for storage of information such as computer readable instructions, data structures, program modules or other data. System memory 1004, removable storage 1008, and non-removable storage 1010 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1000. Any such computer storage media may be part of computing device 1000.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications may be referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed:

1. A method of assisting a learning reader using a decodability index determined for one or more words, said method comprising:

determining and assigning a decodability index to a plurality of articles, magazines or books based on an analysis of one or more words from each of the plurality of articles, magazines or books using a plurality of effects, wherein the assigned decodability index to each of the one or more words from each of the plurality of articles, magazines or books is determined by determining all allowable grapheme-phoneme matches in different languages for each of the one or more words, using orthographic patterns to select a correct grapheme-phoneme match from the determined allowable grapheme-phoneme matches for a chosen language, and using the selected correct grapheme-phoneme match to access oral pronunciations associated with the one or more words for the chosen language, wherein the decodability index is assigned to the entire article, magazine or book of each of the plurality of articles, magazines or books;

assessing the learning reader's ability to pronounce or sound out words by monitoring the learning reader's ability to pronounce or sound out one or more words that have been previously assigned a decodability index and associating the reader with a decodability index at which the reader can proficiently pronounce or sound out one or more words;

assisting the learning reader by assigning a reading program tailored to the learning reader, wherein the reading program comprises a series of articles, magazines or books selected from the plurality of articles, magazines or books each assigned decodability indices, wherein the series of articles, magazines or books for the reading program are selected based on the corresponding decodability index of the plurality of articles, magazines or books; and re-assessing the learning reader's ability to pronounce or sound out words after completing the reading program to determine improvement in the reader's ability to pronounce or sound out one or more words.

2. The method of claim 1, wherein the one or more words from each of the plurality of articles, magazines or books are received, by a computing system as an electronic file.

3. The method of claim 1, wherein the analysis of each of the received one or more words from each of the plurality of articles, magazines or books using the plurality of effects comprises analyzing each of the one or more words using a word frequency effect, a discrepancy effect, a conditional vowels effect and a consonant blends effect.

4. The method of claim 3, wherein assigning the corresponding decodability index to each of the one or more words based on the analysis of the received one or more words comprises a quantification of results from the analysis of the one or more words using the word frequency effect, the discrepancy effect, the conditional vowels effect and the consonant blends effect.

5. The method of claim 4, wherein the quantification of results comprises adding together each of the results from the analysis of the one or more words using the word frequency effect, the discrepancy effect, the conditional vowels effect and the consonant blends effect.

6. The method of claim 1, wherein the chosen language is English.

7. The method of claim 1, wherein the chosen language is a language other than English.

8. A system for assisting a learning reader using a decodability index determined for one or more words, said system comprising:
 a processor;
 an interface communicatively coupled with the processor; and
 a memory communicatively coupled with the processor, wherein the memory contains computer-executable instructions that when executed by the processor cause the processor to:
  determine and assign a decodability index to a plurality of articles, magazines or books based on an analysis of one or more words from each of the plurality of articles, magazines or books using a plurality of effects, wherein the assigned decodability index to each of the one or more words from each of the plurality of articles, magazines or books is determined by determining all allowable grapheme-phoneme matches in different languages for each of the one or more words, using orthographic patterns to select a correct grapheme-phoneme match from the determined allowable grapheme-phoneme matches for a chosen language, and using the selected correct grapheme-phoneme match to access oral pronunciations associated with the one or more words for the chosen language, wherein the decodability index is assigned to the entire article, magazine or book of each of the plurality of articles, magazines or books;
  assess the learning reader's ability to pronounce or sound out words by monitoring the learning reader's ability to pronounce or sound out one or more words that have been previously assigned a decodability index and associating the reader with a decodability index at which the reader can proficiently pronounce or sound out one or more words;
  assist the learning reader by assigning a reading program tailored to the learning reader, wherein the reading program comprises a series of articles, magazines or books selected from the plurality of articles, magazines or books each assigned decodability indices, wherein the series of articles, magazines or books for the reading program are selected based on the corresponding decodability index of the plurality of articles, magazines or books; and
  re-assess the learning reader's ability to pronounce or sound out words after completing the reading program to determine improvement in the reader's ability to pronounce or sound out one or more words.

9. The system of claim 8, wherein the one or more words from each of the plurality of articles, magazines or books are received by the processor over the interface as an electronic file.

10. The system of claim 9, wherein the processor executing computer-readable instructions to analyze each of the received one or more words using the plurality of effects comprises the processor executing computer-readable instructions to analyze each of the received one or more words using a word frequency effect, a discrepancy effect, a conditional vowels effect and a consonant blends effect.

11. The system of claim 10, wherein the processor executing computer-readable instructions to assign the decodability index to each of the received one or more words based on the analysis of the received one or more words comprises the processor executing computer-readable instructions to perform a quantification of results from the analysis of each of the one or more words using the word frequency effect, the discrepancy effect, the conditional vowels effect and the consonant blends effect.

12. A computer program product comprising computer executable instructions stored on a non-transitory computer-readable media, said computer executable instructions perform a method of assisting a learning reader using a decodability index determined for one or more words, said method comprising:
 determining and assigning a decodability index to a plurality of articles, magazines or books based on an analysis of one or more words from each of the plurality of articles, magazines or books using a plurality of effects, wherein the assigned decodability index to each of the one or more words from each of the plurality of articles, magazines or books is determined by determining all allowable grapheme-phoneme matches in different languages for each of the one or more words, using orthographic patterns to select a correct grapheme-phoneme match from the determined allowable grapheme-phoneme matches for a chosen language, and using the selected correct grapheme-phoneme match to access oral pronunciations associated with the one or more words for the chosen language, wherein the decodability index is assigned to the entire article, magazine or book of each of the plurality of articles, magazines or books;
 assessing the learning reader's ability to pronounce or sound out words by monitoring the learning reader's ability to pronounce or sound out one or more words that have been previously assigned a decodability index and associating the reader with a decodability index at which the reader can proficiently pronounce or sound out one or more words;
 assisting the learning reader by assigning a reading program tailored to the learning reader, wherein the reading program comprises a series of articles, magazines or books selected from the plurality of articles, magazines or books each assigned decodability indices, wherein the series of articles, magazines or books for the reading program are selected based on the corresponding decodability index of the plurality of articles, magazines or books; and re-assessing the learning reader's ability to pronounce or sound out words after completing the reading program to determine improvement in the reader's ability to pronounce or sound out one or more words.

13. The computer program product of claim 12, wherein the one or more words are received by a computing system as an electronic file.

14. The computer program product of claim 13, wherein analyzing each of the received one or more words using the plurality of effects comprises analyzing the received one or more words using a word frequency effect, a discrepancy effect, a conditional vowels effect and a consonant blends effect.

15. The computer program product of claim 14, wherein assigning the decodability index to each of the received one or more words based on the analysis of each of the received one or more words comprises a quantification of results from the analysis of the one or more words using the word frequency effect, the discrepancy effect, the conditional vowels effect and the consonant blends effect.

16. The computer program product of claim 15, wherein the decodability index is assigned to the entire article, magazine or book by adding together the decodability index for each word of the article, magazine or book.

17. The computer program product of claim 15, wherein the decodability index is assigned to the entire article, magazine or book by taking a sample of words that comprise the article, magazine or book and the sample of words is determined using statistical analysis.

* * * * *